Nov. 13, 1928.                                                          1,691,448
                              J. F. SEIDEL
              THERMOSTATICALLY CONTROLLED ELECTRIC CIRCUITS
                           Filed June 13, 1927
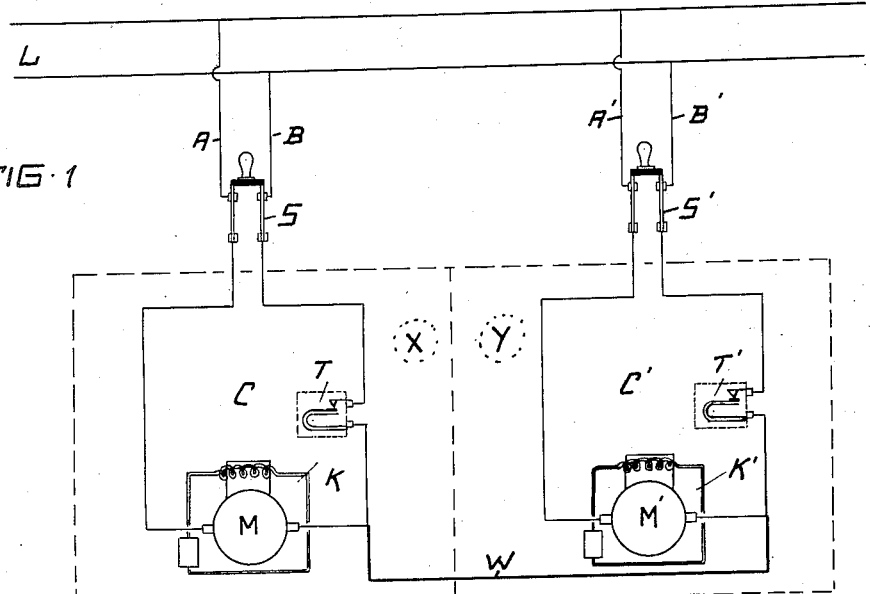
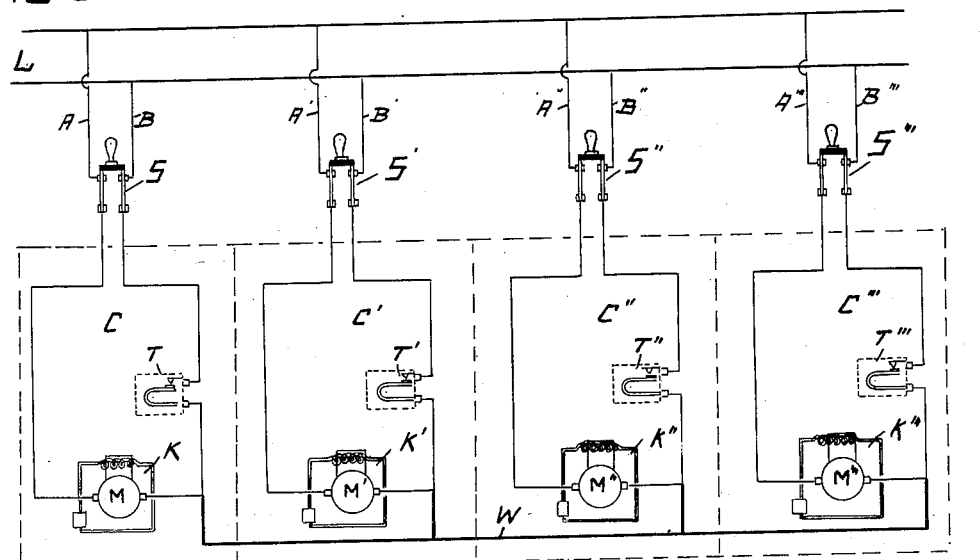
Inventor
JOSEPH F. SEIDEL
By John A. Bommhardt
Attorney Patented Nov. 13, 1928.

1,691,448

UNITED STATES PATENT OFFICE.

JOSEPH F. SEIDEL, OF EUCLID, OHIO.

THERMOSTATICALLY-CONTROLLED ELECTRIC CIRCUITS.

Application filed June 13, 1927. Serial No. 198,552.

This invention relates to thermostatically controlled electric circuits and more particularly to a hook-up of several such circuits for combined action. Thermostatically controlled electric circuits, the kind especially referred to in this specification, are generally used for thermostatic control of the refrigerators in refrigerating chambers. These circuits are individually and so connected to the main line, that all electric refrigerators are in parallel and that each individual circuit acts independently from the other. The thermostatic switches are adjusted to a certain temperature for joint action of all refrigerators. It has been found that an accurate setting of these thermostatic switches is practically impossible and that consequently no joint action of the refrigerators occurs, each refrigerator acting individually as soon as its specific thermostatic switch is operated upon. In other words a refrigerator unit having several such independent circuits individually controlling refrigerators will not use its full capacity but only one or two of the refrigerators—those controlled by thermostatic switches acting at a slightly higher temperature than the rest thereof. The refrigerators controlled by thermostatic switches acting at slightly lower temperature will be practically eliminated and it may occur that one or two of the refrigerators will steadily run while the rest thereof will not act at all. Such action of the unit is not desirable on account of the strain on said active refrigerators.

An object of the invention is to avoid objections of the above kind. According to the invention a specific connection of the separate circuits is arranged, a connection which shunts all the thermostatic switches in respect to each other, so that all the refrigerators are active or inactive at the same time. The shunt connection is so arranged that ineffectiveness of one or more thermostatic switches does not shut off the corresponding refrigerators. An individual shut off of a refrigerator may be made by manually shifting of separate switches. Other objects of the invention will more readily be understood at hand of the following description of the drawings being part hereof and are more particularly pointed out in the appended claims.

In the drawings, Fig. 1 shows a two motor unit, and Fig. 2 a four motor unit, in diagram.

In Fig. 1, X and Y indicate refrigerating chambers which may be separate, or parts of a single large chamber. The motors for these separate chambers or parts are supplied by two individual circuits C and C' are connected by switch members S, S' to the main line L and the net current may flow through the connecting lines A, switch member S, motor M of a refrigerating unit or machine K, thermostatic switch T and line B, in circuit C and connecting line A', switch members S' motor M' of another refrigerating unit, K', thermostatic switch T' and line B' in circuit C', when the thermostatic switch T or T' is respectively actuated. Each circuit would act individually if switch T or T' is operated, but such action is prevented by wire W connected between the motors M, M' respectively and thermostatic switches T, T' respectively, the connection shunting the switches T, T' respectively to each other without changing the other hook up of the circuits. Such an additional connection prevents a single shut off of the current from only one circuit by action of one of the thermostatic switches, as in such a case the current will flow through wire W, and energize the circuit to open both thermostatic switches, that means, that both switches T and T' have to be opened before the circuits C and C' are dead, and motors M, M' not running, and when either switch closes both motors run. The same result could be achieved with only one switch T but especially in large ice chambers the temperature has to be held below a certain degree and for good temperature controlling action several thermostatic devices are necessary.

In Fig. 2, four circuits connected according to the invention are shown indicating more clearly the shunting of the line sections having the thermostatic switches in respect to each other. In this figure corresponding numerals indicate corresponding parts of Fig. 1. It may be stated that the invention is applicable to all hook ups having individually controlled circuits and that also groups of such circuits may be taken to form several individual units for separate sections of a refrigerating chamber.

I claim:

1. The combination with a plurality of refrigerating units each having an electric motor and a thermostatic switch in the motor circuit, of a shunt connection between the respective circuits, whereby the closure of any switch will start all the motors.

2. The combination of a plurality of refrigerating chambers each provided with a refrigerating unit, each unit having an electric motor and a thermostatic switch in the motor circuit, and a shunt connection between the respective circuits, whereby closure of any switch will start all the motors.

In testimony whereof, I do affix my signature.

JOSEPH F. SEIDEL.